United States Patent [19]

Kamaike

[11] Patent Number: 4,623,042

[45] Date of Patent: Nov. 18, 1986

[54] ELEVATOR CONTROL APPARATUS

[75] Inventor: Hiroshi Kamaike, Inazawa, Japan

[73] Assignee: Mitsubishi Denki Kabushiki Kaisha, Tokyo, Japan

[21] Appl. No.: 705,700

[22] Filed: Feb. 26, 1985

[30] Foreign Application Priority Data

Feb. 29, 1984 [JP] Japan .................................. 59-38212

[51] Int. Cl.[4] ................................................ B66B 5/00
[52] U.S. Cl. .................................................. 187/29 R
[58] Field of Search ........................... 187/29; 318/488

[56] References Cited

U.S. PATENT DOCUMENTS

| | | | |
|---|---|---|---|
| 4,027,745 | 6/1977 | Watanabe | 187/29 R |
| 4,030,570 | 6/1977 | Caputo | 187/29 R |
| 4,086,983 | 5/1978 | Anzai et al. | 187/29 R |
| 4,269,286 | 5/1981 | Ishii et al. | 187/29 R |
| 4,271,931 | 6/1981 | Watanabe | 187/29 R |

OTHER PUBLICATIONS

H. Sugimoto and E. Ohno, "Theory and Characteristics of a New Induction Motor Drive System Having Linear Transfer Function", Mar. 1983, International Power Electronics Conference.

*Primary Examiner*—William M. Shoop, Jr.
*Assistant Examiner*—W. E. Duncanson, Jr.
*Attorney, Agent, or Firm*—Leydig, Voit & Mayer, Ltd.

[57] ABSTRACT

An elevator control apparatus wherein a primary current of an induction motor is controlled separately for a component parallel to a secondary interlinking magnetic flux and a component orthogonal thereto, comprising means to generate a correction signal having a predetermined frequency, phase and magnitude which cancel a magnetic flux ripple of the induction motor attributed to a shaft deflection of a hoisting machine caused by action of an elevator load, the correction signal from the means being superposed on either of the components parallel and orthogonal to the secondary interlinking magnetic flux so as to control the primary current. Thus, even when the shaft deflection is involved, a control free from any torque ripple is permitted, and an elevator of comfortable ride can be realized.

10 Claims, 13 Drawing Figures

ELEVATOR CONTROL APPARATUS

BACKGROUND OF THE INVENTION

This invention relates to an elevator control apparatus which employs an induction motor, and more particularly to a control apparatus for elevators which eliminates a magnetic flux ripple ascribable to the air gap fluctuation of an induction motor caused by the deflection of a shaft.

In recent years, an induction motor has been utilized as the electric motor of a hoisting machine for elevators, and an inverter of the variable voltage and variable frequency system has been used as means for controlling the speed of the induction motor over a wide range from the stop state to the full speed thereof.

FIG. 1 is a half sectional view showing a conventional hoisting machine for elevators which employs the aforementioned induction motor as a driving source. Numeral 1 designates the bed of the hoisting machine, and numeral 2 the induction motor installed on the bed 1. This induction motor 2 includes a stator 2a and a rotor 2b, which is fastened to a shaft 3 arranged on the center axis of the induction motor 2. One end of the shaft 3 is mounted on a bracket 2c unitary with the induction motor 2 so as to be rotatable through a bearing 4, while the other end of the shaft 3 is extended out of the housing of the induction motor 2 and is mounted on a bracket 5 installed on the bed 1 so as to be rotatable through a bearing 6. In addition, a sheave 7 is mounted round that part of the shaft 3 which lies between the induction motor 2 proper and the bracket 5. Further, a brake drum 8 is integrally formed at one side edge of the sheave 7, an arm 9 having a brake shoe 9a is disposed on the outer peripheral side of the brake drum 8 so as to be freely opened or closed, and the brake arm 9 is actuated by a brake magnet 10.

In the hoisting machine constructed as stated above, the cage and counterweight of the elevator are suspended by a main rope wound round the sheave 7, so that the load of the elevator acts on the sheave 7. In consequence, the shaft 3 supported at both the ends deflects downwards. When the shaft 3 deflects downwards, the air gap Ga between the stator 2a and rotor 2b of the induction motor 2 becomes larger on the upper side and smaller on the lower side as shown in FIG. 2.

Accordingly, a rotating magnetic flux to be generated by affording a magnetomotive force of identical magnitude to the induction motor is maximized when it passes through a path of low reluctance, that is, when the sense thereof is downward as indicated by an arrow or upward as viewed in FIG. 3. When the magnetic flux is in the leftward or rightward sense, it is minimized because it passes through the air gap part of high reluctance over a longer distance. This situation is illustrated in FIG. 4.

FIG. 4 represents the angle of a magnetic flux vector (zero for the downward flux vector in FIG. 3) on the axis of abscissas, and the magnitude of a magnetic flux on the axis of ordinates. Relative to a reference magnetic flux indicated by a straight line I, the magnetic flux vector attendant upon the deflection of the shaft is in the shape of a sine wave which fluctuates by 2 cycles during one revolution of the rotor 2b as indicated by a curve II.

A torque T which the induction motor generates is given by:

$$T = i_{2g} \cdot \Phi$$

where $i_{2g}$: the component of a secondary current orthogonal to a rotating magnetic field. Therefore, when the magnetic flux $\Phi$ has the ripple as the curve II in FIG. 4, the torque oscillates at the same ripple frequency to drastically worsen a comfortable ride in the elevator.

For the purpose of obviating the above problem, it is considered to increase the strength of the shaft 3 so that the shaft may not deflect even when subjected to the elevator load. This, however, necessitates designing the shaft to be thick and cannot be said practical on account of increase in the weight of the hoisting machine, etc.

SUMMARY OF THE INVENTION

This invention has solved the problem of the prior art described above, and has for its object to provide an elevator control apparatus in which control means is controlled by superposing a sinusoidal wave of a predetermined frequency or a correction signal similar thereto on either of components parallel and orthogonal to a secondary interlinking magnetic flux, whereby even when an induction motor involves an air gap fluctuation due to the deflection of a shaft, no torque ripple arises to ensure a comfortable ride.

PREFERRED EMBODIMENTS OF THE INVENTION

Now, embodiments of this invention will be described with reference to the drawings.

Figure 5:
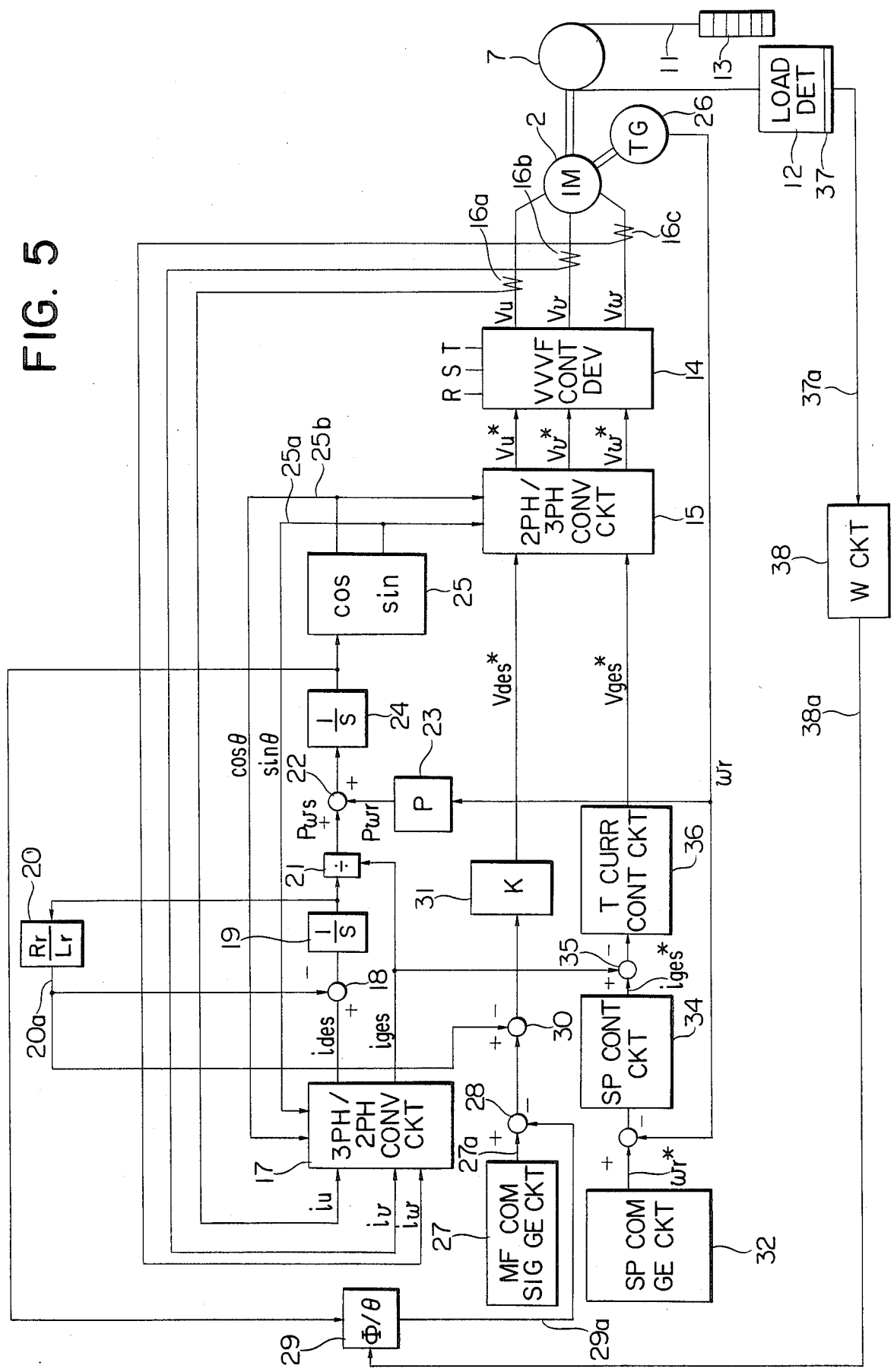
FIG. 5 is a block diagram showing an embodiment of an elevator control apparatus according to this invention.

FIGS. 5-8 show an embodiment of an elevator control apparatus according to this invention, in which FIG. 5 is an arrangement diagram of an elevator control system for controlling a magnetic flux to be variable by employing an induction motor of PWM (pulse-width modulation) inverter control.

Referring to FIG. 5, numeral 11 designates a main rope which is wound round a sheave 7. The cage 12 of an elevator is suspended at one end of this main rope 11, while the counterweight 13 is suspended at the other end. A three-phase induction motor 2 for driving the sheave 7 is fed with primary voltages $V_u$, $V_v$ and $V_w$ close to respective voltage commands $V_u^*$, $V_v^*$ and $V_w^*$ from a variable voltage and variable frequency control device (hereinbelow, abbreviated to 'VVVF control device') 14 which is connected to a three-phase power source having phases R, S and T. The VVVF control device 14 is fed with the voltage commands $V_u^*$, $V_v^*$ and $V_w^*$ from a two-phase/three-phase conversion circuit 15, which is constructed of an adder-subtracter composed of an operational amplifier and a multiplier or a D/A converter.

Symbols 16a, 16b and 16c denote current transformers for deriving current feedback signals $i_u$, $i_v$ and $i_w$ which correspond to the primary currents of the U-phase, V-phase and W-phase of the induction motor 2 respectively. The current feedback signals $i_u$, $i_v$ and $i_w$ derived by the respective current transformers 16a–16c are applied to a three-phase/two-phase conversion circuit 17. The three-phase/two-phase conversion circuit 17 is constructed of an adder-subtracter circuit composed of an operational amplifier and a multiplier or a D/A converter, and it converts the current feedback signals $i_u$, $i_v$ and $i_w$ into components $i_{des}$ and $i_{ges}$ on coordinate axes which rotate in synchronism with the angular frequency $\omega$ of the secondary magnetic flux vector of the induction motor 2. This conversion is performed on the basis of the following formula (1):

$$\begin{bmatrix} i_{des} \\ i_{ges} \end{bmatrix} \begin{bmatrix} \cos\theta \; \sin\theta \\ \sin\theta \; \cos\theta \end{bmatrix} \begin{bmatrix} \frac{2}{3} & \frac{-1}{\sqrt{6}} & \frac{-1}{\sqrt{6}} \\ 0 & \frac{1}{\sqrt{2}} & \frac{-1}{\sqrt{2}} \end{bmatrix} \begin{bmatrix} i_u \\ i_v \\ i_w \end{bmatrix} \quad (1)$$

Here, $\sin\theta$ and $\cos\theta$ in Eq. (1) are the sinusoidal outputs of a function generator 25 to be described later.

The signal component $i_{des}$ delivered from the three-phase/two-phase conversion circuit 17 is applied to a subtracter 18, and the difference signal thereof with respect to an output signal from a coefficient multiplication circuit 20 is applied to an integrator 19. An output signal from the integrator 19 is applied to the coefficient multiplication circuit 20 and a divider 21, which is further supplied with the signal component $i_{ges}$ delivered from the three-phase/two-phase conversion circuit 17.

The subtracter 18, integrator 19, coefficient multiplication circuit 20 and divider 21 constitute a circuit which calculates a slip angular frequency $P_{\omega s}$ and a secondary magnetic flux. The output signal of the divider 21 becomes the slip angular frequency $P_{\omega s}$, and the output signal of the multiplication circuit 20 the secondary magnetic flux. $R_r$ and $L_r$ in the coefficient multiplication circuit 20 designate the secondary resistance value and secondary inductance value of the induction motor 2 to be used as parameters by the control circuitry, respectively, and a vector control of high precision is permitted by employing accurate values based on an experiment.

Shows at numeral 22 is an adder for evaluating the angular frequency $\omega$ of a secondary mangetic flux vector on the basis of the slip frequency $P_{\omega s}$ which is the output signal of the divider 21, and a rotor angular frequency $P_{\omega r}$ which is obtained in such a way that a rotor angular velocity $\omega_r$ produced by a tachometer generator 26 directly coupled with the induction motor 2 is multiplied by the number of pole pairs P by means of a multiplier 23. Numeral 24 indicates an integration circuit which serves to compute the phase angle $\theta$ of the secondary magnetic flux vector by integrating the angular frequency $\omega$ obtained with the adder 22. When supplied with the signal of the phase angle $\theta$ computed by the integration circuit 24, the function generator 25 provides the sinusoidal signal $\sin\theta$ and the consinusoidal signal $\cos\theta$ having the phase angle $\theta$. The sinuoisal signal $\sin\theta$ and consinusoidal signal $\cos\theta$ are applied to the two-phase/three-phase conversion circuit 15 and the three-phase/two-phase conversion circuit 17. The function generator 25 is constructed of an A/D converter, a D/A converter, a ROM, etc.

Numeral 27 indicates a magnetic flux command signal generating circuit. A magnetic flux command signal 27a from this circuit 27 is applied to a subtracter 28, which evaluates the difference between the magnetic flux command signal 27a and a correction signal 29a from a correction signal generating unit 29. The evaluated difference signal is compared with the secondary magnetic flux signal of the multiplication circuit 20 by a subtracter 30 so as to subtract the latter from the former. A magnetic flux deviation thus detected is amplified by a magnetic flux control circuit 31, and it is used for controlling the magnetic flux of the inductiion motor 2 so as to become equal to a predetermined command value at all times. That is, a voltage command $V_{des}^*$ is created in the magnetic flux control circuit 31 and is input to the two-phase/three-phase conversion circuit 15.

Numeral 32 indicates a speed command signal generating circuit. A speed command signal $\omega_r^*$ from this circuit 32 and the rotational speed signal $\omega_r$ of the induction motor 2 produced by the tachometer generator 26 are compared by a subtracter 33 so as to subtract the latter from the former. A speed deviation $(\omega_r^* - \omega_r)$ thus detected is input to a speed control circuit 34, thereby to create the torque current command $i_{ges}^*$ of the induction motor 2 in correspondence with the speed deviation. Besides, the torque current command $i_{ges}^*$ delivered from the speed control circuit 34 and the torque current feedback signal $i_{ges}$ from the three-phase/two-phase conversion circuit 17 are compared by a subtracter 35 so as to subtract the latter from the former. A torque current deviation $(i_{ges}^* - i_{ges})$ thus detected is subjected to a computation by a torque current control circuit 36 and is generated as a voltage command $V_{ges}^*$. This voltage command $V_{ges}^*$ is supplied to the two-phase/three-phase conversion circuit 15.

The current command $V_{des}^*$ and $V_{ges}^*$ in two phases generated by the magnetic flux control circuit 31 and the torque current control circuit 36 are supplied to the two-phase/three-phase conversion circuit 15, threby to be converted into the voltage commands $V_u^*$, $V_v^*$ and $V_w^*$ in three phases, which are input to the VVVF control device 14 as the speed control commands. The conversion is performed on the basis of the following formula (2):

$$\begin{bmatrix} V_u^* \\ V_v^* \\ V_w^* \end{bmatrix} = \begin{bmatrix} \sqrt{\frac{2}{3}} & 0 \\ \frac{-1}{\sqrt{6}} & \frac{1}{\sqrt{2}} \\ \frac{-1}{\sqrt{6}} & \frac{-1}{\sqrt{2}} \end{bmatrix} \begin{bmatrix} \cos\theta & -\sin\theta \\ \sin\theta & \cos\theta \end{bmatrix} \begin{bmatrix} V_{des}^* \\ V_{ges}^* \end{bmatrix} \quad (2)$$

When fed with the three-phase voltage commands thus obtained, the VVVF control device 14 supplies the primary voltages $V_u$, $V_v$ and $V_w$ to the induction motor 2 is accordance with them.

In FIG. 5, numeral 37 designates a load detector which is attached to the cage 12 and which produces a signal 37a corresponding to a load in the cage. The load signal 37a of the load detector 37 is input to a weighing circuit 38, which generates a weighing command value 38a in accordance with the load signal, the weighing command value 38a being input to the correction signal generating unit 29.

Figure 7:
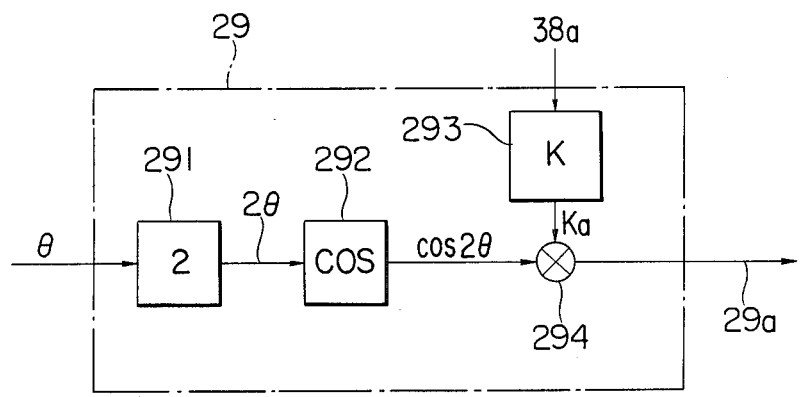
FIG. 7 is a block diagram showing an example of a correction signal generating unit in this invention.

As shown in FIG. 7, the correction signal generating unit 29 is constructed of a non-inverting amplifier 291 having a gain of 2, a cos generator 292, a correction gain calculating circuit 293, and a multiplier 294. The phase angle $\theta$ of the secondary magnetic flux vector delivered from the integration circuit 24 (refer to FIG. 5) is amplified to $2\theta$ by the non-inverting amplifier 291 of the gain 2, and this signal of $2\theta$ is converted into $\cos 2\theta$ is multiplied by an output signal Ka from the correction gain calculating circuit 293 by means of the multiplier 294, to generate the correction signal 29a.

Figure 4:
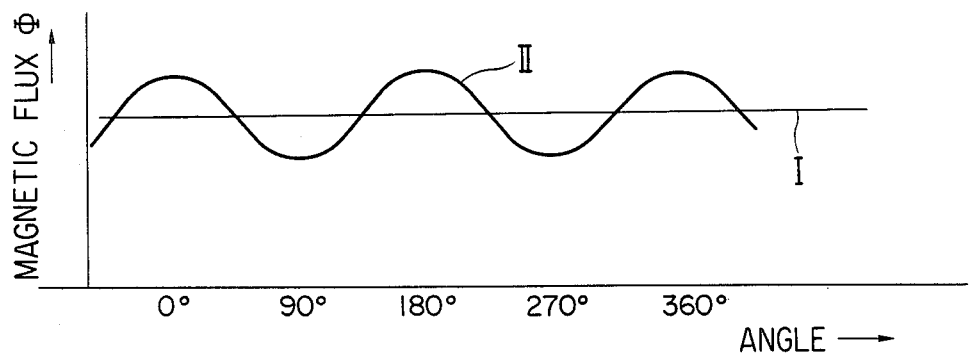
FIG. 4 is a characteristic diagram showing the relationship between a magnetic flux and a rotational angle at the deflection of a shaft.
Figure 8:
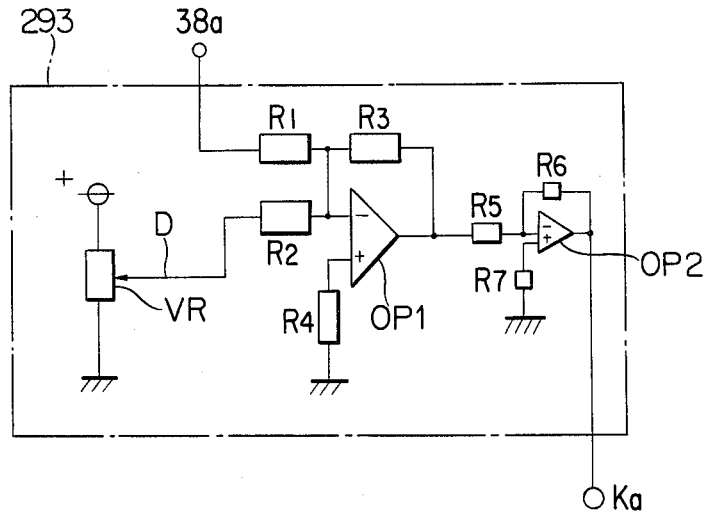
FIG. 8 is a circuit diagram showing a practicable example of a correction gain computing circuit which constitutes the correction signal generating unit in this invention.

FIG. 8 shows a practicable circuit diagram of the correction gain calculating circuit 293. This circuit is constructed of an adder which is composed of an operational amplifier OP1 and resistors R1–R4, an amplifier which is composed of an operational amplifier OP2 and resistors R5–R7, and a variable resistor VR from which a signal D corresponding to a load on the sheave is derived irrespective of the cage load. The adder adds the two inputs of the signal D set by the variable resistor VR and the weighing command value 38a delivered from the weighing circuit 38, and the result is amplified by the amplifier so as to generate the output signal Ka. Accordingly, the correction signal 29a provided from the correction signal generating unit 29 is identical in phase and equal in magnitude to the variation (corresponding to the A.C. component shown in FIG. 4) of the magnetic flux $\Phi$ ascribable to the deflection of the shaft.

Figure 6:
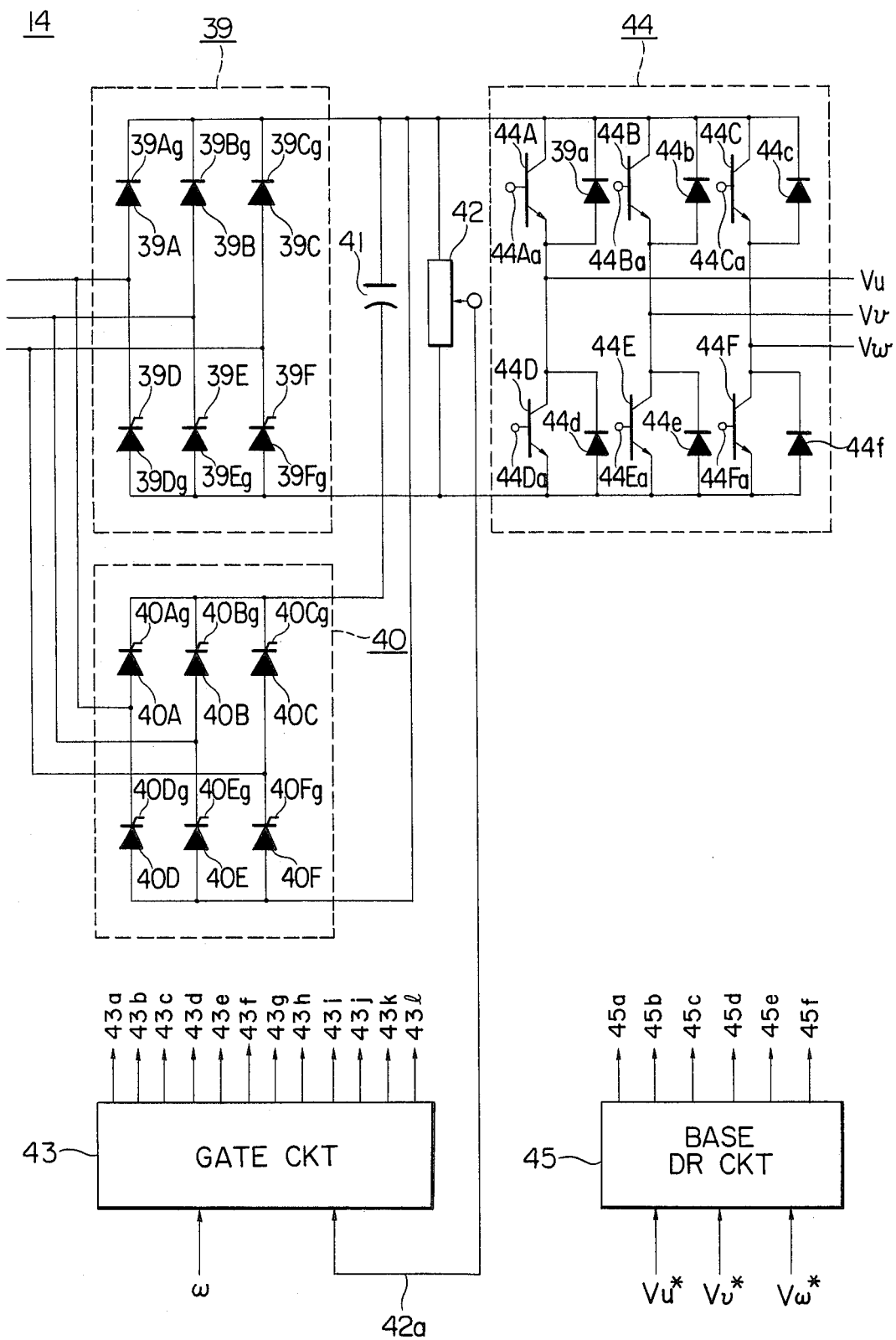
FIG. 6 is a circuit diagram of a VVVF control device in this invention.

FIG. 6 shows a practicable circuit diagram of the VVVF control device 14. Numeral 39 denotes a power running converter which forms a three-phase full-wave rectification circuit by means of thyristors 39A–39F connected as a three-phase bridge to the phases R, S and T of the A.C. power source. Symbols 39Ag–39Fg denote the gates of the thyristors 39A–39F. Numeral 40 denotes a regenerative braking converter which forms a three-phase full-wave rectification circuit by means of thyristors 40A–40F, and which has its A.C. end side connected to the A.C. power source R, S, T and its D.C. end side connected to the D.C. side of the power running converter 39. Symbols 40Ag–40Fg denote the gates of the thyristors 40A–40F. In addition, numeral 41 indicates a smoothing capacitor which is connected across the D.C. ends of the power running converter 39, and numeral 42 a voltage detector which is connected across both the terminals of the smoothing capacitor 41 and which is constructed of a resistor. Shown at numeral 43 is a gate circuit which receives the synchronous angular velocity signal $\omega$ and the output signal 42a of the voltage detector and generates trigger signals 43a–43l corresponding to the synchoronous angular velocity signal $\omega$. The trigger signals 43a–43f are respectively applied to the gates 39Ag–39Fg of the thyristors 39A–39F of the power running converter 39, while the trigger signals 43g–43l are respectively applied to the gates 40Ag–40Fg of the thyristors 40A–40F of the regenerative braking converter 40. Numeral 44 indicates an inverter which is connected across both the terminals of the smoothing capacitor 41. It includes six transistors 44A–44F, which are such that three sets each having two transistors connected in series with each other are connected in parallel. Further, diodes 39a–39f are respectively connected in parallel with the transistors 44A–44F. Thus, the A.C. output voltages $V_u$, $V_v$ and $V_w$ are respectively provided from the nodes of the sets between the series-connected transistors 44A and 44D, 44B and 44E, and 44C and 44F. Besides, numeral 45 indicates a base driving circuit which receives the primary voltage command values $V_v^*$, $V_v^*$ and $V_w^*$ from the two-phase/three-phase conversion circuit 15 and generates base driving signals 45a–45f. The respective base driving signals 45a–45f are supplied to the bases 44Aa–44Fa of the transistors 44A–44F of the inverter 44.

Next, the operation of the present embodiment constructed as described above will be explained.

When the magnetic flux command signal 27a is output from the magnetic flux command signal generating circuit 27, it has the correction signal 29a of the correction signal generating unit 29 subtracted therefrom by the subtracter 28. Further, the difference signal is compared in the subracter 30 with the magnetic flux signal 20a from the multiplication circuit 20, namely, the magnetic flux calculated from the currents actually flowing through the motor 2, so as to subtract the latter from the former, whereupon the deviation signal between the two is output. This deviation signal is input to the two-phase/three-phase conversion circuit 15 through the magnetic flux control circuit 31.

On one hand, the speed command value $\omega_r^*$ delivered from the speed command signal generating circuit 32 is input to the subracter 33 and is compared with the speed signal $\omega_r$ from the tachometer generator 26 so as to subtract the latter from the former, whereupon the deviation signal being the difference of the two is output. This deviation signal is processed by the speed control circuit 34 into the torque current command $i_{ges}^*$, which is input to the subracter 35. Here, it is compared with the torque current feedback signal $i_{ges}$ delivered from the three-phase/two-phase conversion circuit 17, namely, the torque current components of the currents having actually flowed through the motor 2, so as to subtract the latter from the former, whereupon the deviation signal being the difference of the two is input to the two-phase/three-phase conversion circuit 15 as the voltage command $V_{ges}^*$ by the torque current control circuit 36.

On the other hand, the slip frequency signal $P_{\omega s}$ becomes the synchoronous angular velocity signal $\omega$ when added by the adder 22 with the rotor angular frequency $P_{\omega r}$ which is obtained by multiplying the speed signal $\omega_r$ by the number of pole pairs P by means of the multiplier 23. Besides, this angular velocity signal $\omega$ is integrated by the integrator 24, thereby to become the rotational angle signal corresponding to the rotational angle $\theta$. The sin $\theta$ signal 25a and cos $\theta$ signal 25b corresponding to the rotational angle $\theta$ are calculated by the sin·cos converter 25, and are sent to the two-phase/three-phase conversion circuit 15 as well as the three-phase/two-phase conversion circuit 17.

The two-phase/three-phase conversion circuit 15 converts the sin $\theta$ signal 25a, the cos $\theta$ signal 25b, and the voltage command values $V_{des}^*$ and $V_{ges}^*$ being its input signals and provides the primary voltage command values $V_u^*$, $V_v^*$ and $V_w^*$, which are supplied to the VVVF control device 14.

The gate circuit 43 of the VVVF control device 14 decides whether the motor 2 is in the mode of power running or in the mode of regenerative braking, on the basis of the output signal 42a of the voltage detector 42 and the synchoronous angular velocity signal $\omega$. Subject to the power running operation, it applies the trigger signals 43a–43f to the power running converter 39, whereas subject to the regenerative braking operation, it applies the trigger signals 43g–43l to the regenerative braking converter 40. As a result, the terminal voltage of the smoothing capacitor 41 is varied to perform the well-known PAM (pulse-amplitude modulation) control. Besides, the base driving circuit 45 applies the base driving signals 45a–45f to the inverter 44 on the basis of the primary voltage command values $V_u^*$, $V_v^*$ and $V_w^*$ so as to perform the well-known PWM (pulse-width modulation) control.

Thus, the VVVF control device 14 generates the A.C. output voltages $V_u$, $V_v$ and $V_w$ of variable voltages and variable frequencies, the induction motor 2 is driven, and the cage 12 runs with its speed automatically controlled at high precision. A magnetic flux command at this time is one obtained by subtracting the correction signal 29a from the magnetic flux command signal 27a being the reference signal, and the correction signal 29a has a frequency, a phase and a magnitude which cancel the magnetic flux ripple attributed to the shaft deflection. Therefore, the actual magnetic flux does not incur a torque ripple even when the air gap varies depending upon the position of the rotor on account of, e.g., the shaft deflection. Accordingly, an elevator of comfortable ride can be realized.

Figure 9:
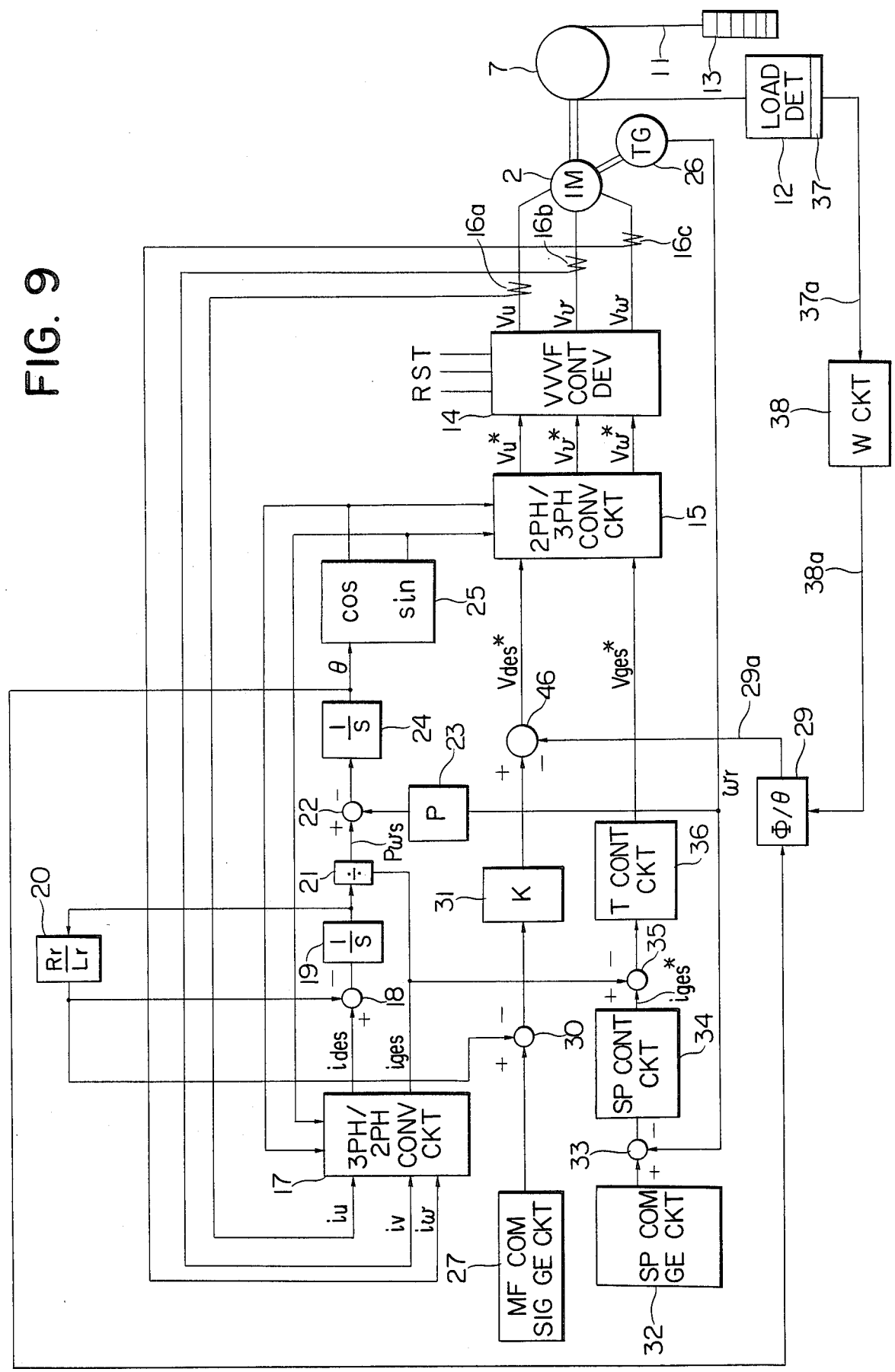
FIG. 9 is a block diagram showing another embodiment of the elevator control apparatus of this invention.

FIG. 9 shows another embodiment of the elevator control apparatus of this invention.

In this figure, the same symbols as in FIG. 5 denote identical portions. A point of difference from FIG. 5 is that, in a signal line which couples the magnetic flux control circuit 31 and the two-phase/three-phase conversion circuit 15, a subtracter 46 is inserted so as to subtract the correction signal 29a of the correction signal generating unit 29 from the output signal of the magnetic flux control circuit 31.

Even with such embodiment, an effect similar to that of the embodiment shown in FIG. 5 can be expected.

Although no illustration is made, it is also allowed to subtract the correction signal 29a from the output signal of the speed control circuit 34 or the output signal of the torque current control circuit 36. Further, while the magnitude of the magnetic flux, the output signal of the multiplication circuit 20 and the rotational angle $\theta$ have been evaluated by the use of the function generator in the foregoing embodiment, they may well be directly detected using a Hall element or a resolver.

Figure 1:
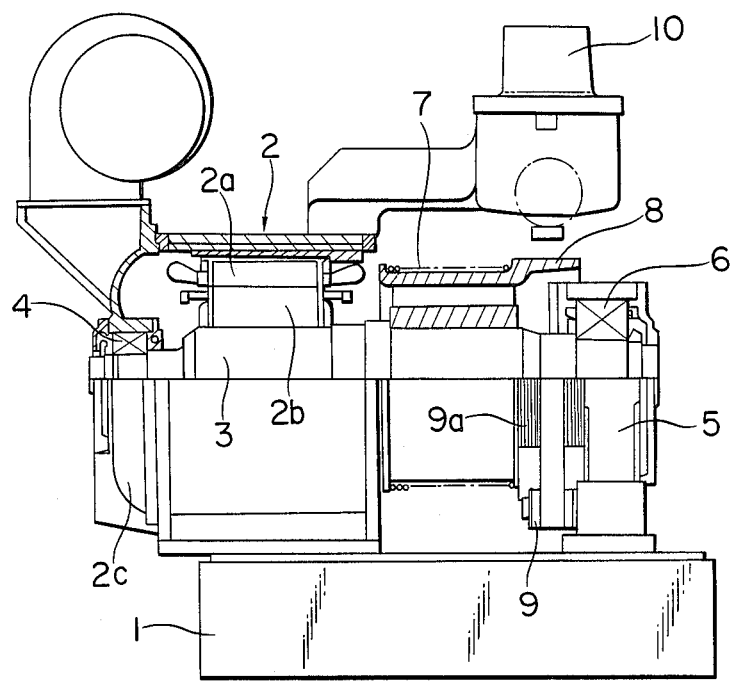
FIG. 1 is a side view, partly cut away, showing a hoisting machine of an A.C. motor control system which employs a variable voltage and variable frequency inverter unit.
Figure 2:
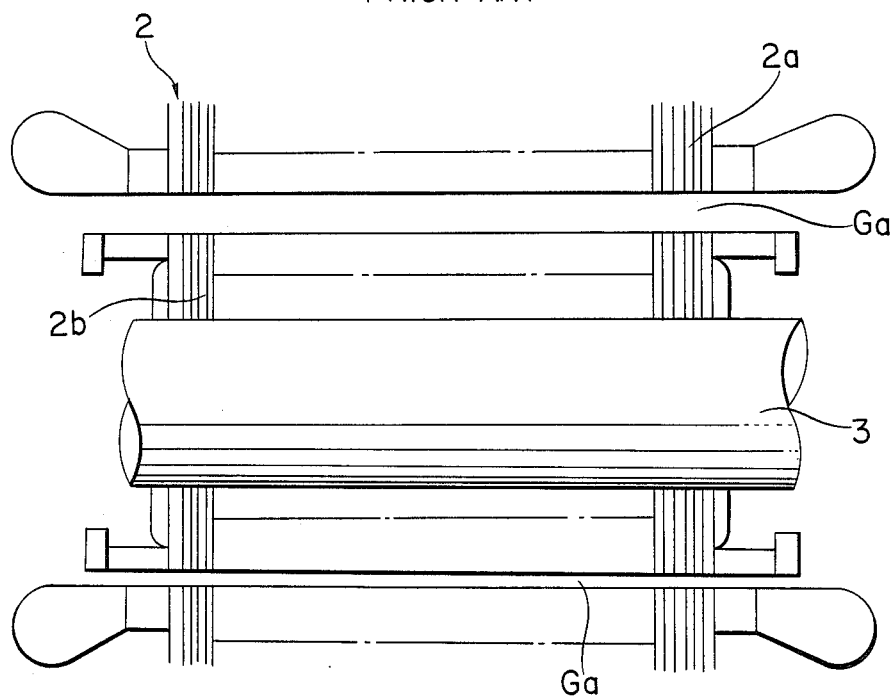
FIG. 2 is an explanatory sectional view of a part of an induction motor showing the relationship between the rotor and stator thereof.
Figure 3:
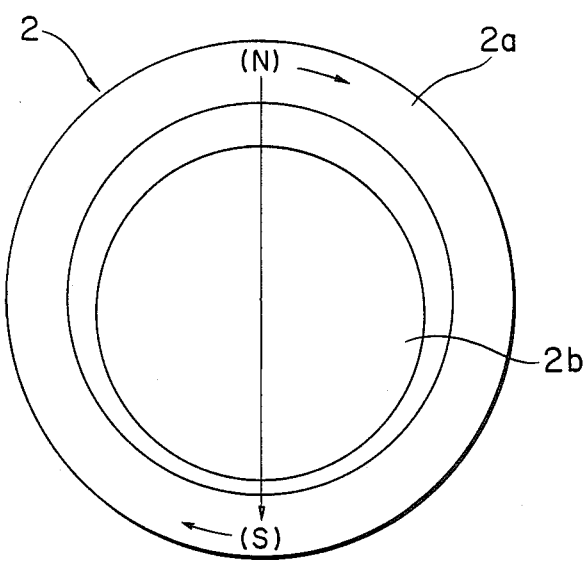
FIG. 3 is an explanatory view showing the relationship between the rotor and the stator.
Figure 10:
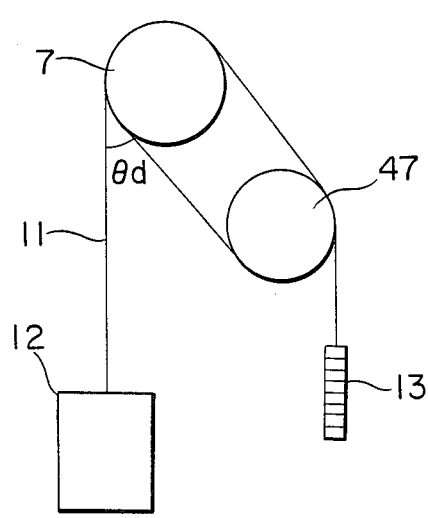
FIG. 10 is a diagram for explaining a roping form which uses a deflector wheel.
Figure 11:
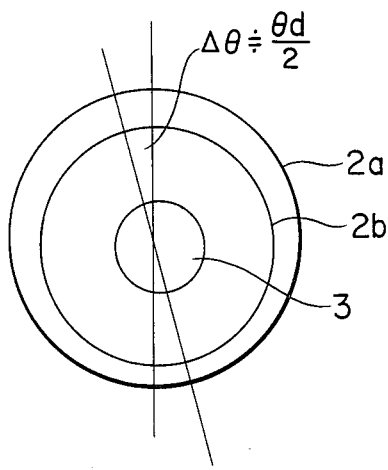
FIG. 11 is an explanatory diagram showing the positional relationship between the rotor and stator of the motor attributed to the deflection of the shaft in the case of using the deflector wheel.
Figure 12:
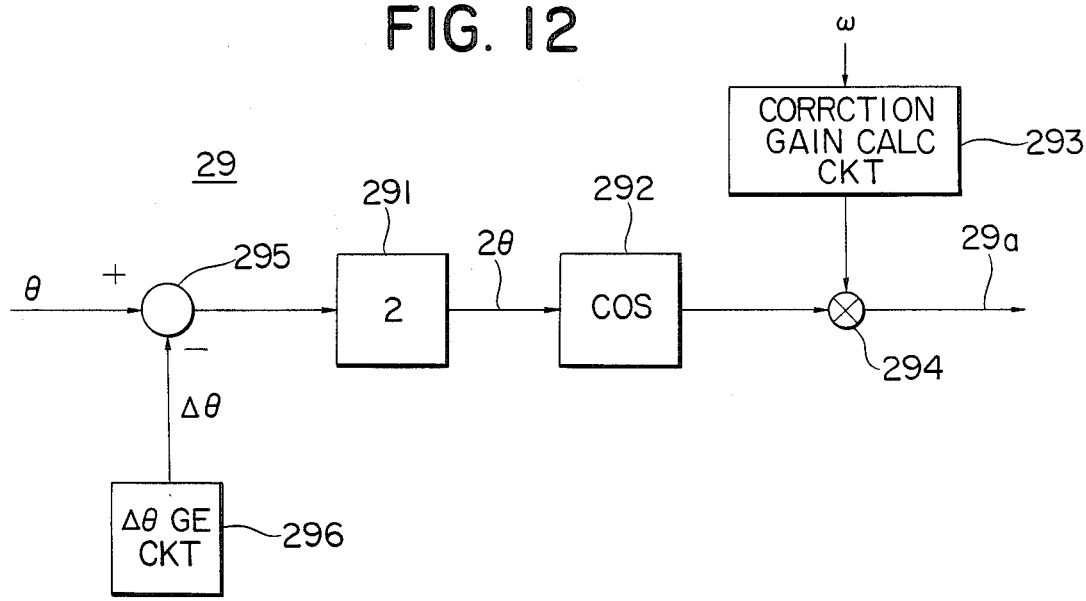
FIG. 12 is a block diagram showing an example of the correction signal generating unit in this invention in the case of using the deflector wheel.

FIGS. 10–13 illustrate a method of generating a correction signal in the case of employing a deflector wheel. As shown in FIG. 10, a main rope 11 is wound round and extended between a sheave 7 and the deflector wheel 47. A cage 12 is suspended by the end of the main rope hanging from the side of the sheave 7, while a counterweight 13 is suspended by the end of the main rope handing from the side of the deflector wheel 47. In consequence, a shaft 3 is drawn by the resultant vector of a force in the direction of deflection owing to the deflector wheel 47 and a force in the vertical direction and deflects as shwon in FIG. 11. The direction of the resultant vector at this time defines an angle which is nearly equal to $\frac{1}{2}$ of a deflection angle $\theta_d$. Accordingly, the rotational angle at which the magnetic flux is maximized shifts by $\Delta\theta$ in comparison with that in the case of FIG. 3. A practicable circuit of a correction signal generating unit 29 for producing the correction signal with the $\Delta\theta$ component compensated is shown in FIG. 12.

In FIG. 12, the same symbols as in FIG. 7 denote identical portions. In order to compensate the $\Delta\theta$ component, a subtracter 295 is disposed on the input side of a non-inverting amplifier 291. This subtracter 295 is supplied with a $\Delta\theta$ signal from a $\Delta\theta$ component generating circuit 296 and subtracts the signal corresponding to the $\Delta\theta$ component from a rotational angle signal corresponding to $\theta$. The difference is input to the non-inverting amplifier 291 and then passed through a cos generator 292 as well as a multiplier 294. Thus, the correction signal 29a with the $\Delta\theta$ component compensated is output.

Figure 13:
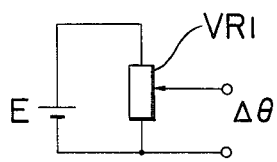
FIG. 13 is a circuit diagram showing a practicable example of a $\Delta\theta$ component generating circuit which constitutes the correction signal generating unit in FIG. 12.

FIG. 13 shows a practicable example of the $\Delta\theta$ component generating circuit 296, which is constructed of a D.C. power source E and a variable resistor VR1.

As set forth above, according to this invention, a correction signal is generated so as to correct a torque ripple which is caused by a magnetic flux ripple arising when the air gap of an induction motor fluctuates due to the deflection of the shaft of a hoisting machine, and the correction signal is input to a control device. Therefore, even when the shaft deflection is involved, a control free from any torque ripple becomes possible, and an elevator of comfortable ride can be realized.

I claim:

1. In an elevator control apparatus wherein a primary current of an induction motor is controlled separately for a component parallel to a secondary interlinking magnetic flux and a component orthogonal thereto; an elevator control apparatus comprising means to generate a correction signal having a predetermined frequency, phase and magnitude which cancel a magnetic flux ripple of the induction motor attributed to a shaft deflection of a hoisting machine caused by action of an elevator load, the correction signal from said means being superposed on either of the components parallel and orthogonal to the secondary interlinking magnetic flux so as to control the primary current.

2. An elevator control apparatus according to claim 1, further comprising shaft deflection detection means to detect the shaft deflection, the correction signal generation means creating the correction signal by receiving a shaft deflection detection signal generated by said shaft deflection detection means.

3. An elevator control apparatus according to claim 2, further comprising magnetic flux command signal generation means to generate a magnetic flux command signal for the motor, magnetic flux detection means to detect an actual magnetic flux in said motor and to generate a signal expressive of the detected magnetic flux, and means to receive both the signals and to generate a signal which controls said motor so as to equalize the magnetic flux detection signal to the magnetic flux command signal, said correction signal generation means creating the correction signal by receiving the magnetic flux detection signal.

4. An elevator control apparatus according to claim 2, wherein the correction signal is combined with the magnetic flux command signal provided by said magnetic flux command signal generation means, and the combined signal is supplied to the control signal generation means as the magnetic flux command signal.

5. An elevator control apparatus according to claim 3, wherein the magnetic flux detection signal which is applied to the correction signal generation means is a signal which expresses a phase angle of a secondary magnetic flux vector of said motor.

6. An elevator control apparatus according to claim 3, wherein said magnetic flux detection means detects current flowing through said motor and creates the magnetic flux detection signal on the basis of the detected current value.

7. An elevator control apparatus according to claim 2, wherein said shaft deflection detection means includes a load detector which detects a load in a cage and generates a signal expressive of the load.

8. An elevator control apparatus according to claim 7, wherein said correction signal generation means includes means to generate a signal corresponding to the load acting on a shaft irrespective of the load in the cage and creates the signal expressive of the shaft deflection on the basis of both the generated signal and the cage load signal.

9. An elevator control apparatus according to claim 1, wherein said correction signal generation means includes compensation signal generation means to compensate the correction signal in conformity with a direction of a deflective force acting on a shaft.

10. An elevator control apparatus according to claim 9, wherein the hoisting machine of the elevator includes a sheave and a deflector wheel, and the compensation signal is determined in correspondence with a direction of a resultant vector of the vertical direction and a deflecting direction of said deflector wheel.

* * * * *